United States Patent [19]

Akiyama et al.

[11] 4,451,417
[45] May 29, 1984

[54] METHOD OF PRODUCING EXTRUDED PLATE-LIKE POLYSTYRENE FOAM

[75] Inventors: Hiroyuki Akiyama; Hidewo Hatakeyama, both of Hiratsuka; Nobuyoshi Shimoyashiki, Kanuma; Yoshiaki Momose, Hiratsuka; Fusao Imai, Kanuma, all of Japan

[73] Assignee: Japan Styrene Paper Corporation, Tokyo, Japan

[21] Appl. No.: 450,218

[22] Filed: Dec. 16, 1982

[30] Foreign Application Priority Data

Dec. 25, 1981 [JP]   Japan ................................ 56-209318

[51] Int. Cl.³ ............................................. B29D 27/00
[52] U.S. Cl. ................................ 264/53; 264/DIG. 5; 521/79; 521/98; 521/146
[58] Field of Search ........................... 264/DIG. 5, 53; 521/146, 79, 98

[56]   References Cited

U.S. PATENT DOCUMENTS

| | | | |
|---|---|---|---|
| 3,160,688 | 12/1964 | Aykanian et al. | 264/DIG. 5 |
| 4,020,025 | 4/1977 | Zeitler et al. | 264/DIG. 5 |
| 4,085,175 | 4/1978 | Keuchel | 264/DIG. 5 |
| 4,260,572 | 4/1981 | Akiyama et al. | 264/DIG. 5 |

*Primary Examiner*—Philip E. Anderson
*Attorney, Agent, or Firm*—Sherman & Shalloway

[57]   ABSTRACT

In a method of producing a plate-like polystyrene resin foam which comprises extruding a molten mixture of a polystyrene resin and a volatile blowing agent from an extruder into a zone kept at a lower pressure than the inside of the extruder, the improvement wherein the volatile blowing agent is a mixture consisting of 50 to 80% by weight of dichlorodifluoromethane and 50 to 20% by weight of ethyl chloride and is present in said molten mixture in a proportion of 8 to 17 parts by weight per 100 parts by weight of the polystyrene resin.

3 Claims, No Drawings

METHOD OF PRODUCING EXTRUDED PLATE-LIKE POLYSTYRENE FOAM

This invention relates to a method of producing a plate-like polystyrene resin foam having excellent heat insulating property, high mechanical strength and good dimensional stability with good extrusion-formability.

Extrusion-formed polystyrene foams, usually in a plate form, have found extensive use as heat insulating materials because of their light weight, outstanding heat-insulating effect, relatively low production cost, and ease of handling and application.

It is well known in the art that the heat insulating characteristics of the plate-like polystyrene resin foams are affected by the kind and amount of a blowing agent used for their production. For example, the specifications of Japanese Laid-Open Patent Publications Nos. 24269/1977 and 94366/1977 each disclose a method of producing a plate-like polystyrene resin foam having excellent heat insulating property by using a specified amount of a specified blowing agent. The plate-like foams obtained by these methods, however, have proved to have only unsatisfactory heat insulating properties and insufficient dimensional stability.

Many other methods of producing plate-like polystyrene foams by extrusion forming have been disclosed in patent documents and elsewhere, but none have been found to be satisfactory in regard to extrusion formability during production and the various properties required for use as heat insulating materials.

The present inventors have made assiduous investigations in order to provide a method of producing a plate-like polystyrene resin foam having excellent heat insulating property, mechanical strength and dimensional stability suitable for use as a heat insulating material by extrusion forming. These investigations have led to the discovery that by using a specified amount of a mixed volatile blowing agent containing specified proportions of dischlorodifluoromethane and ethyl chloride, a polystyrene resin foam having the aforesaid properties can be produced easily with good extrusion formability.

It is an object of this invention therefore to provide a plate-like polystyrene resin foam having excellent heat insulating property, particularly a polystyrene resin foam having a heat conduction resistance R, determined for a 25 mm-thick specimen kept at an average temperature of 23.9° C. (75° F.), of at least 5. The heat conduction resistance R, as used herein, is defined as the quotient of the thickness (inches) of the specimen divided by its thermal conductivity (Btu.inches/ft$^2$.hr.° C.). The larger the R value, the better the heat insulating property of the specimen.

Another object of this invention is to provide a method by which a plate-like polystyrene resin foam having a large width can be produced easily by extrusion forming.

Still another object of this invention is to provide a plate-like polystyrene resin foam having excellent mechanical strength and good dimensional stability.

The aforesaid objects and advantages of this invention are achieved, in a method of producing a plate-like polystyrene resin foam which comprises extruding a molten mixture of a polystyrene resin and a volatile blowing agent from an extruder into a zone kept at a lower pressure than the inside of the extruder, by the improvement wherein the volatile blowing agent is a mixture consisting of 50 to 80% by weight of dichlorodifluoromethane and 50 to 20% by weight of ethyl chloride and is present in said molten mixture in a proportion of 8 to 17 parts by weight per 100 parts by weight of the polystyrene resin.

The polystyrene resin used in this invention is a homopolymer or copolymer having styrene as a major constituent monomer. The proportion of the styrene monomer component in the polymer is at least 50 mole%, preferably at least 80 mole%. It also includes a blend of such a polymer with another resin.

Illustrative of the homopolymer or copolymer suitable for the production of plate-like foams by the method of this invention are polystyrene, high-impact polystyrene, a copolymer of styrene and maleic anhydride, a copolymer of styrene and acrylonitrile, and a copolymer of styrene, butadiene and acrylonitrile. Examples of the other resin which can be used as a blend with such a polymer are polyethylene, polypropylene, a copolymer of ethylene and vinyl acetate, polyvinyl chloride, and a copolymer of an acrylic or methacrylic acid ester.

Preferably, the polystyrene resin exemplified above has a weight average molecular weight (to be referred to simply as a molecular weight hereinafter), measured by gel permeation chromatography (GPC), of $20 \times 10^4$ to $35 \times 10^4$.

The use of such a polystyrene resin is important in providing plate-like foams having high mechanical strength and good dimensional stability.

Generally, in the production of a plate-like polystyrene foam by a conventional technique, the foam as extruded from the die orifice is passed through a shaping device called a guider to shape it into a plate of a predetermined shape. Hence, a polystyrene resin having a molecular weight of as high as more than $20 \times 10^4$ is considered as unsuitable from the standpoint of extrusion formability, and the usual practice is to use polystyrene resins having high flowability, for example having a molecular weight of as low as less than $20 \times 10^4$. Such a low-molecular-weight polystyrene resins have improved extrudability, but the resulting plate-like foams have low mechanical strength and poor dimensional stability.

It has now been found in accordance with this invention that the selection of the volatile blowing agent formulation within the range specified in this invention can permit the use of polystyrene resins having a molecular weight of at least $20 \times 10^4$.

Preferably, however, the molecular weight of the polystyrene resin used in this invention should not exceed $35 \times 10^4$.

The volatile blowing agent used in the method of this invention is a mixed blowing agent consisting of 50 to 80% by weight of dichlorodifluoromethane and 50 to 20% by weight of ethyl chloride.

Investigations of the present inventors have shown that the use of a mixed blowing agent of specified proportions of dichlorodifluoromethane and ethyl chloride in the method of this invention results in a reduction in the thermal conductivity of the resulting foam and therefore imparts excellent heat insulating property to the foam product, and that ethyl chloride serves to regulate properly the flowability of the foamable molten gel and thus to better its extrusion formability, and also makes it possible to increase the amount of the mixed blowing agent used and to obtain a product of high expansion ratios easily. It has also been made clear that as a result of increasing the amount of the mixed blowing agent, the content of dichlorodifluoromethane in the foamed product can be increased and therefore a plate-like foam having excellent heat insulating property can be obtained easily.

More specifically, when the content of dichlorodifluoromethane in the mixed blowing agent is less than 50% by weight, a foam having a heat conduction resistance R of at least 5 cannot be obtained and the resulting product has poor heat insulating property. If it exceeds 80% by weight, the extrusion formability of the molten mixture of the polystyrene resin is poor and corrugation occurs in the resulting product. As a result, a plate-like foam having a large width cannot be obtained. In order to obtain a plate-like foam having a large width with good extrusion formability, it is essential that the content of dichlorodifluoromethane in the mixed blowing agent be 50 to 80% by weight. A plate-like foam having especially outstanding properties can be obtained when the content of dichlorodifluoromethane is 52.5 to 62.5% by weight.

Ethyl chloride improves the flowability and extrusion formability of the polystyrene resin and makes it possible to use the mixed blowing agent in a relatively large amount. If the proportion of ethyl chloride is less than 20% by weight, the use of a large amount of the mixed blowing agent cannot give a highly expanded plate-like foam having a good shape because surging occurs and the extrusion formability of the molten resin mixture becomes poor. Hence, the amount of the mixed blowing agent is restricted, and only a plate-like foam of a low expansion ratio can be obtained.

The mixed blowing agent is used in this invention in an amount of 8 to 17 parts by weight per 100 parts by weight of the polystyrene resin. If its amount is less than 8 parts by weight, the density of the resulting plate-like foam becomes high. If it exceeds 17 parts by weight, surging occurs during the extruding operation and a plate-like foam having a good shape is difficult to obtain. Even if such a well-shaped plate-like foam can be obtained, it has excessively low density and reduced mechanical strength, or the cells become large and non-uniform to degrade the heat insulating property of the product.

When the proportions of dichlorodifluoromethane and ethyl chloride in the mixed blowing agent used in this invention fall within the above-specified range, their functions are organically combined to produce the excellent effects described hereinabove. If, therefore, one of these components is lacking, the excellent effects of the invention cannot be expected. For example, if only dichlorodifluoromethane is used as the blowing agent, surging tends to occur during the extruding operation, and therefore the amount of the blowing agent is restricted and a product having a high expansion ratio cannot be obtained. On the other hand, if only ethyl chloride is used as the blowing agent, the resulting plate-like foam has very poor heat insulating property.

As stated hereinabove, only the mixed blowing agent having the specified composition in accordance with this invention exhibits excellent effects in the production of a plate-like foam suitable as a heat insulating material. The present invention is especially advantageous for the production of a plate-like foam having a heat conduction resistance R of at least 5, a large width of, for example, at least 1200 mm, high mechanical strength, for example a compression strength in the thickness direction of at least 25 kg/cm$^2$, and good dimensional stability.

Another blowing agent such as propane, butane and pentane may be added to the mixed blowing agent of the above-specified composition in amounts which do not interfere with the objects of this invention.

The individual components of the mixed blowing agent may be fed into the extruder from a blowing agent injection port either separately or as a pre-mixture.

In the method of this invention, the polystyrene resin is fed, preferably in the form of pellets, into the extruder and melted under heat. The resulting molten mass gradually advances and is mixed with the blowing agent in a mixing zone before it reaches a cooling zone. The temperature at which the foamable molten gel mixed with the blowing agent is extruded from a die orifice is a temperature at which the foamable molten gel shows a melt viscosity suitable for foaming. Accordingly, the extrusion temperature differs depending upon the kind of the polystyrene resin or the composition and amount of the blowing agent, and is generally 90° to 120° C. The pressure of the die orifice is generally 50 to 140 kg/cm$^2$.

The foamable molten gel extruded into a low-pressure zone through the orifice is expanded and then continuously shaped into a plate-like foamed article having a fixed cross-sectional area by being passed through a shaping device generally called a guider.

In the present invention, scraps formed at the time of machining the plate-like foam obtained by extrusion forming into a final product for end uses may be pulverized and mixed with a fresh starting material for re-use. The suitable amount of the scrap is up to about 30% by weight based on the weight of the fresh polystyrene resin.

A cell regulating agent may be added in order to make the cells of the plate-like foam finer. The cell regulating agent may be a fine powder of an inorganic compound such as talc and clay, or a compound capable of generating a gas upon decomposition or chemical change at the heating temperature, for example a combination of a polycarboxylic acid or its acid alkali metal salt with a carbonate or bicarbonate. The cell regulating agent is used generally in an amount of 0.05 to 3 parts by weight per 100 parts by weight of the polystyrene resin.

If desired, the starting material may further contain additives such as coloring agents, heat stabilizers and fillers in amounts which do not interfere with the objects of this invention.

The following examples illustrate the present invention more specifically.

EXAMPLE 1

One hundred parts by weight of polystyrene having a molecular weight of $22 \times 10^4$ and 0.1 part by weight of a cell regulating agent composed of an equimolar mixture of monosodium citrate and sodium bicarbonate were fed into an extruder having an inside cylinder diameter of 120 mm.

Separately, 12 parts by weight, per 100 parts by weight of the polystyrene, of a mixed blowing agent consisting of 60% by weight of dichlorodifluoromethane and 40% by weight of ethyl chloride was forced into the extruder through a blowing agent injection port.

The foamable molten gel kneaded uniformly in the extruder was extruded at 110° C. into the outer atmosphere through a die orifice having a width of 600 mm and a clearance of 6 mm attached to the exit end of the extruder. The foamed product was passed through a guider annexed to the extruder to give a plate-like foam having a cross-sectional size of about 1200 mm in width and about 28 mm in thickness.

The plate-like foam was cut and machined to a cross-sectional size of 1200 mm in width, 25 mm in thickness and 1800 mm in length to prepare test specimens.

The composition of the mixed blowing agent and the extrusion formability of the gel observed during the production process are shown in Table 1. The various properties of the test specimens are also shown in Table 1.

EXAMPLES 2 TO 4 AND COMPARATIVE EXAMPLES 1 TO 4

The procedure of Example 1 was repeated except that each of the mixed blowing agents indicated in Table 1 was used.

The results are also shown in Table 1.

The various properties shown in Table 1 were measured as follows:

Heat conduction resistance R

Measured after the lapse of three months from production.

Compression strength

Compression strength in the thickness direction.

Dimensional stability

After production, the specimen was left to stand at 20° C. for 72 hours, and then heated in an oven at 70° C. for 22 hours. The degree of change in the dimension of the specimen from that immediately after preparation was determined, and made the dimensional stability. The change was rated as follows:

Excellent: the change was within ±0.5%.
Good: the change was within ±1.0%.
Poor: the change was greater than ±1.0%.

TABLE 1

| Run | Mixed blowing agent | | | Extrusion formability | Foamed product | | | | |
|---|---|---|---|---|---|---|---|---|---|
| | Dichlorodi-fluoro-methane (wt. %) | Ethyl chloride (wt. %) | Amount (parts by weight) | | Density (g/cm$^3$) | Average cell diameter (mm) | Heat conduction resistance (in/Btu · in/ ft$^2$ · hr · °F.) | Compression strength (kg/cm$^2$) | Dimensional stability |
| Example | | | | | | | | | |
| 1 | 60 | 40 | 15 | Good | 0.028 | 0.3 | 5.3 | 2.7 | Excellent |
| 2 | 75 | 25 | 10 | Good | 0.033 | 0.2 | 5.8 | 3.0 | Good |
| 3 | 53 | 47 | 10 | Good | 0.030 | 0.3 | 5.2 | 2.8 | Excellent |
| 4 | 60 | 40 | 9 | Good | 0.032 | 0.3 | 5.1 | 2.9 | Excellent |
| Comparative Example | | | | | | | | | |
| 1 | 45 | 55 | 12 | Good | 0.029 | 0.3 | 4.8 | 2.7 | Good |
| 2 | 60 | 40 | 7 | Good | 0.038 | 0.2 | 4.7 | 3.3 | Good |
| 3 | 82 | 18 | 12 | Poor | Corrugation occurred and a plate-like foam of good quality could not be obtained. | | | | |
| 4 | 60 | 40 | 19 | Poor | Surging occurred and a plate-like foam could not be obtained. | | | | |

What is claimed is:

1. In a method of producing a plate-like polystyrene resin foam by extruding a molten mixture of a polystyrene resin and a volatile blowing agent from an extruder into a zone kept at a lower pressure than the inside of the extruder, the improvement which comprises extruding a mixture of a polystyrene resin having a weight average molecular weight, measured by gel permeation chromatography, of $20 \times 10^4$ to $35 \times 10^4$ with from 8 to 17 parts by weight per 100 parts by weight of the polystyrene resin of a volatile blowing agent which is a mixture consisting of 50 to 80% by weight of dichlorodifluoromethane and 50 to 20% by weight of ethyl chloride from said extruder into said zone kept at a lower pressure than the inside of the extruder, said plate-like polystyrene resin foam having a heat conduction resistance R, determined for a 25 mm-thick specimen kept at an average temperature of 75° C., of at least 5.

2. The method of claim 1 wherein the proportion of dichlorodifluoromethane in the mixed blowing agent is 52.5 to 62.5% by weight.

3. The method of claim 1 wherein the plate-like polystyrene resin foam has a width of at least 1200 mm.

* * * * *